(12) United States Patent
Ng et al.

(10) Patent No.: US 9,177,073 B2
(45) Date of Patent: Nov. 3, 2015

(54) IDENTIFYING IMPLICIT SERVICES LINKS USING SERVICE USAGE INFORMATION

(75) Inventors: Joanna W. Ng, Markham (CA); Leho Nigul, Markham (CA)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/938,885

(22) Filed: Nov. 3, 2010

(65) Prior Publication Data
US 2011/0106844 A1 May 5, 2011

(30) Foreign Application Priority Data
Nov. 4, 2009 (CA) .................................... 2684353

(51) Int. Cl.
*G06F 7/00* (2006.01)
*G06F 17/30* (2006.01)

(52) U.S. Cl.
CPC .... *G06F 17/30893* (2013.01); *G06F 17/30238* (2013.01)

(58) Field of Classification Search
CPC ................................................ G06F 17/30238
USPC ......................................................... 707/785
See application file for complete search history.

(56) References Cited

U.S. PATENT DOCUMENTS

| | | | |
|---|---|---|---|
| 7,188,114 B2 | 3/2007 | Liu et al. | |
| 2002/0184402 A1* | 12/2002 | Gangopadhyay | 709/315 |
| 2004/0225654 A1* | 11/2004 | Banavar et al. | 707/6 |
| 2005/0132381 A1 | 6/2005 | Fiammante et al. | |
| 2008/0244527 A1 | 10/2008 | Chang et al. | |
| 2009/0204612 A1 | 8/2009 | Keshavarz-Nia et al. | |
| 2010/0318570 A1* | 12/2010 | Narasinghanallur et al. | 707/783 |

OTHER PUBLICATIONS

Bhaskar Mehta et al., "An Architecture for Recommendation Based Service Mediation," Book—Semantics of a Networked World, vol. 3226/2004, 2004.
Chen, et al., "Data Mining and Service Rating in Service-Oriented Architectures to Improve Information Sharing," Aerospace Conf, IEEE, Mar. 2005, pp. 1-11.
Sellanni,et al., "A Recommender System for Web Services Discovery in a Distributed Registry Environnnent," 4th International Conf. on Internet and Web Applications, 2009, pp. 418.
Kuck, et al.,"A Collaborative and Feature-Based Approach to Context-Sensitive Service Discovery," on Emerging Applications for Wireless and Mobile Access,May 2007.

* cited by examiner

*Primary Examiner* — Ajith Jacob
(74) *Attorney, Agent, or Firm* — Steven M. Greenberg, Esq.; CRGO Law (57) ABSTRACT

Embodiments of the invention include a computer-implemented process for identifying implicit services links, using service usage information, in service registries and repositories. Service registry and repository receives service access information for a service to form received information, creates a services access context object in real time from all received information or a selected subset of received information to form a created services access context object, and stores the created services access context object in a data structure to form a stored services access context object. The computer-implemented process further analyzes a set of stored services access context objects in real time to form a set of results, wherein the results are within a predefined certainty and sends the result to a requester. The set of results comprises a set of implicit soft links determined by usage information in the services access context objects, wherein the implicit soft links are implicit services links.

20 Claims, 4 Drawing Sheets

IDENTIFYING IMPLICIT SERVICES LINKS USING SERVICE USAGE INFORMATION

CROSS-REFERENCE TO RELATED APPLICATIONS

This application claims priority under 35 U.S.C. §119(a) to Canadian Patent Application Serial Number 2684353, filed Nov. 4, 2009, entitled "IDENTIFYING IMPLICIT SERVICES LINKS USING SERVICE USAGE INFORMATION", the entirety of which is incorporated herein by reference.

BACKGROUND

1. Technical Field

This disclosure relates generally to service registries and repositories in a data processing system and more specifically identifying implicit services links, using service usage information, in service registries and repositories in the data processing system.

2. Description of the Related Art

Service registries and repositories (SRR) are considered as one of the corner stones of a typical service oriented architecture implementation. A service registry and repository is typically combined into a single system but may also be implemented as separate components linked together for cooperative processing of requests. A service repository allows users to store, manage, and query service metadata artifacts containing service descriptions. A registry provides functions for registered service declarations and elements of the derived content models with user-defined properties, relationships, and classifiers.

It is possible to explicitly associate relationships between different services in the repository; however it is not sufficient for identifying the soft links based on the services usage. For example, a suggestions function available on a typical online book ordering sites provides a capability to propose a list of books bought or considered by other customers who previously purchased the same book being considered by a customer. This is an example of behavioral or usage knowledge. The books are not related to each in any way other than the fact that the books are often bought together by consumers. This information can only be obtained from observing the consumer usage patterns and cannot be predicted before hand.

Behavioral patterns intelligence is typically missing from available services registries and repositories, where the intelligence can be applied in more ways than currently done on multiple businesses to consumers sites. Typical services are treated as separate entities, or a relationship between services is defined prior to use and much information available from observing services usage patterns is therefore not utilized.

BRIEF SUMMARY OF THE INVENTION

According to one embodiment, a computer-implemented process for identifying implicit service links is presented. The computer-implemented process receives service access information for a service to form received information, creates a services access context object in real time from all received information or a selected subset of received information to form a created service access context object, and stores the created service access context object in a data structure to form a stored service access context object. The computer-implemented process further analyzes a set of stored service access context objects in real time to form a set of results, wherein the results are within a predefined certainty and sends the result to a requester.

According to another embodiment, a computer program product for identifying implicit services links is presented. The computer program product comprises a computer recordable media containing computer executable program code stored thereon. The computer executable program code comprises computer executable program code for receiving service access information for a service to form received information, computer executable program code for creating a service access context object in real time from all received information or a selected subset of received information to form a created service access context object, computer executable program code for storing the created service access context object in a data structure to form a stored service access context object, computer executable program code for analyzing a set of stored service access context objects in real time to form a set of results, wherein the results are within a predefined certainty and computer executable program code for sending the result to a requester.

According to another embodiment, an apparatus for identifying implicit services links is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric, wherein the processor unit executes the computer executable program code to direct the apparatus to receive service access information for a service to form received information, create a service access context object in real time from all received information or a selected subset of received information to form a created service access context object, store the created service access context object in a data structure to form a stored service access context object, analyze a set of stored service access context objects in real time to form a set of results, wherein the results are within a predefined certainty, and send the result to a requester.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
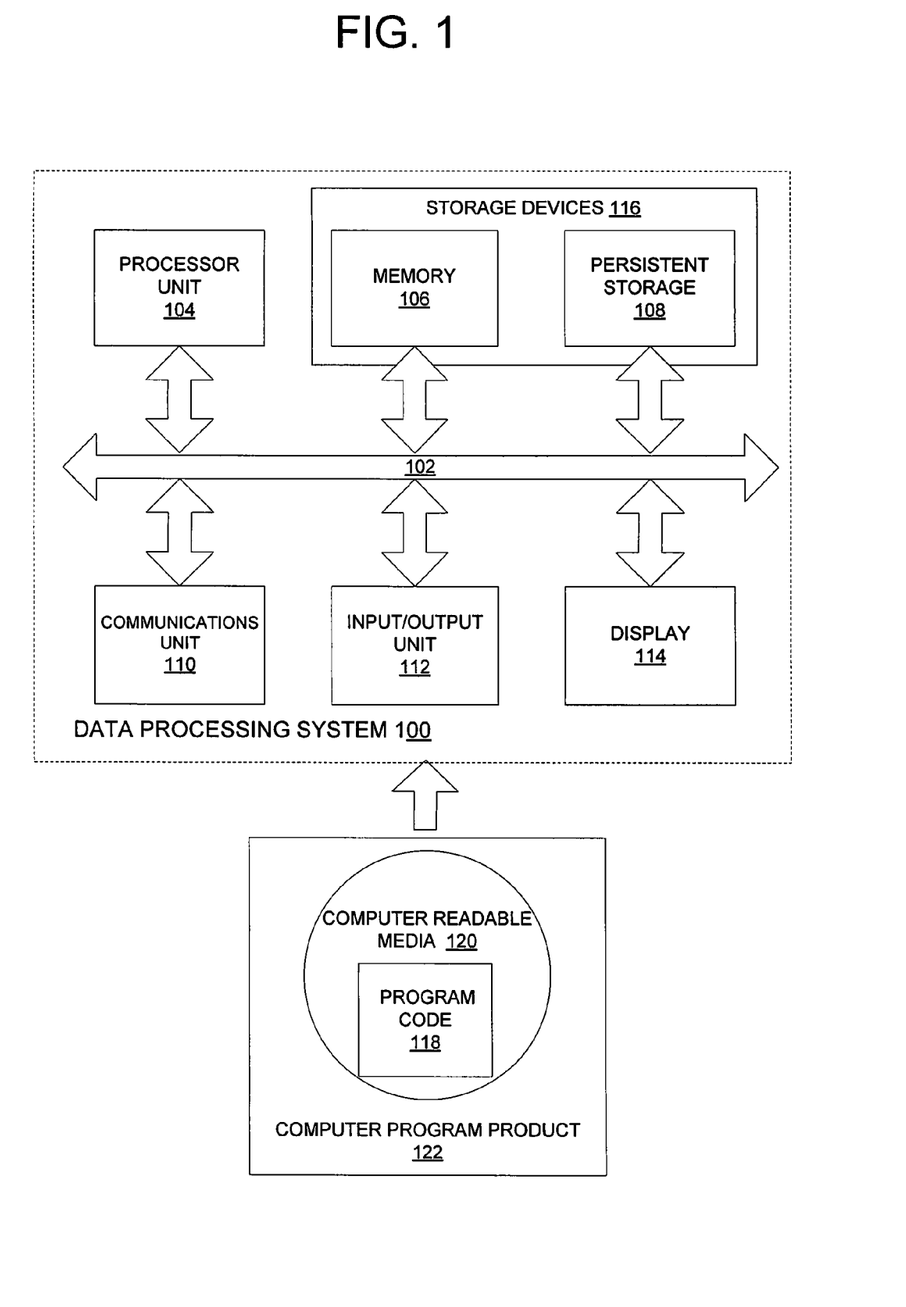
FIG. 1 is a block diagram of an exemplary data processing system operable for various embodiments of the disclosure.

Turning now to FIG. 1, a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer.

Display 114 provides a mechanism to display information to a user.

Instructions for the operating system, applications and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for identifying implicit services links, using service usage information, in service registries and repositories receives service access information for a service to form received information, creates a services access context object in real time from the received information to form a created service access context object, and stores the created service access context object in a data structure to form a stored service access context object. The computer-implemented process further analyzes a set of stored service access context objects in real time to form a set of results and sends the result to a requester. The set of results comprises a set of implicit soft links determined by usage information in the services access context objects, wherein the implicit soft links are implicit services links. Implicit soft links are provided along with the probably data for existence of such links.

Using data processing system 100 of FIG. 1 as an example, an illustrative embodiment provides the computer-implemented process stored in memory 106, executed by processor unit 104, for receiving service access information for a service through communications unit 110 or input/output unit 112 or storage device 116 to form received information. Processor unit 104 creates a service access context object in real time from the received information to form a created service access context object, and stores the created service access context object in a data structure maintained in storage devices 116 to form a stored service access context object. Processor unit 104 further analyzes a set of stored service access context objects in real time to form a set of results and sends the result to a requester typically through communications unit 110. The set of results comprises a set of implicit soft links determined by usage information in the service access context objects, wherein the implicit soft links are implicit services links.

In another example, a computer-implemented process uses program code 118 stored in memory 106 or as a computer program product 122.

In an alternative embodiment, program code 118 containing the computer-implemented process may be stored within computer readable media 120 as computer program product 122. In another illustrative embodiment, the process may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Illustrative embodiments provide a capability to enhance the operation of service registries and repositories by utilizing the concepts of services usage intelligence. For example, based on intelligence information, an implementation according to the illustrative embodiments will be able to respond to scenarios where users use a specific service, and determine what other services they are likely to use as well.

Other examples include, answering if users are interested in a specific service, what other services they are likely to be interested in as well. "Interested" as opposed to "use" in this example means that users might search for some services through a service registries and repositories user interface and then receive a proposal, for example, "users that search a payment service have most often used Service A and have also been interested in Service B and Service C." In a related example, the query can determine, if users use a specific service, what other services were used prior to using the given service and if users used the specific service, what other services are likely to be used afterwards.

Another example query may determine the best service for specific circumstances from N available similar services, where "specific circumstances" means certain context parameters. For example, the query can determine whether or not there some soft relationship between specific service and other services in terms of affected quality of service, and other parameters. The query also can determine when a certain version of a specific service is used, the versions of other services that are likely to be used. The query yet further can determine the "rank" of the service among other similar services based on specific parameters including quality of service, type of user of the service and user feedback. Even yet further, the query can determine similar services, available in the repository, based on the interface parameters and meta-data. Finally, the query can determine the quality of service correlations with other services, for example, when three other seemingly unrelated services are slow, whether a service of interest response also is slow.

Service consumers benefit through a set of capabilities including finding new relevant services easily, obtaining best services from a pool of similar services, and estimating services that suit their needs the most. Service providers benefit through a set of capabilities to determine soft links between different services, determine usage patterns of existing services, which might lead to optimization of service offerings or a new offering, and receiving statistics including statistics for sequencing of services usage.

Figure 2:
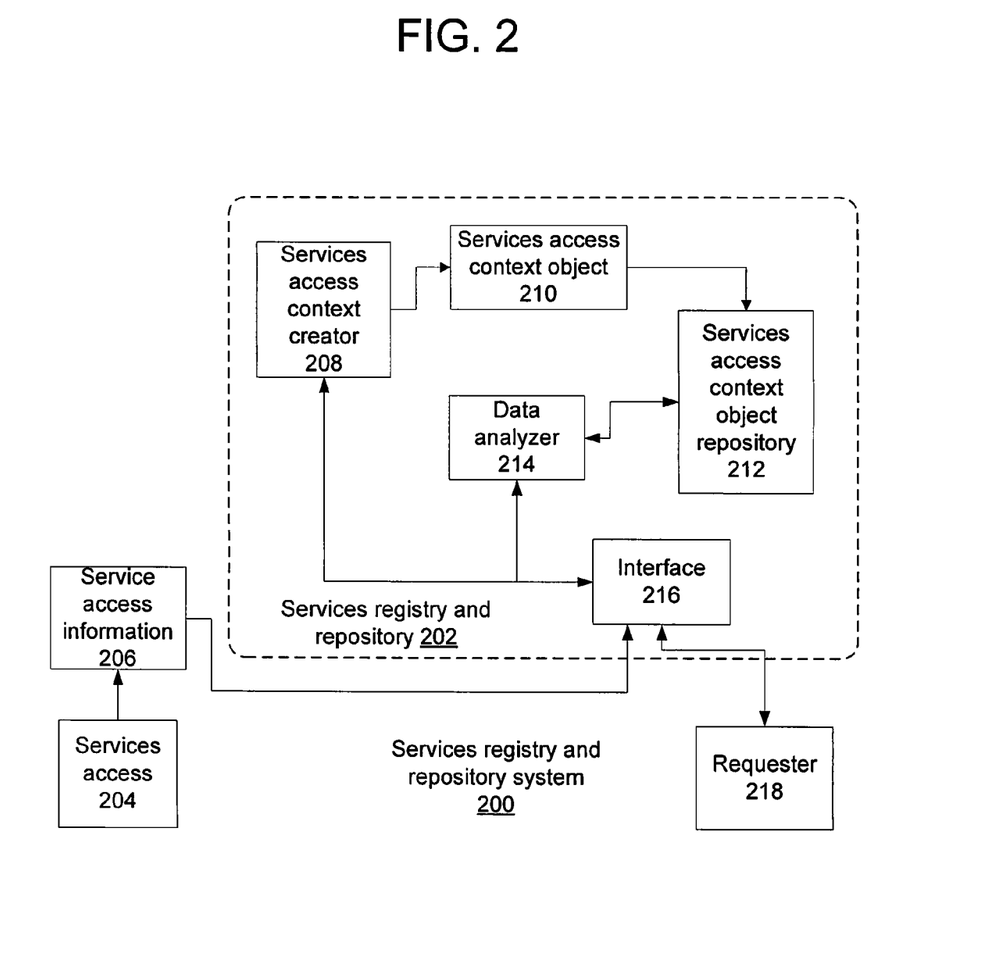
FIG. 2 is a block diagram of a services registry and repository, in accordance with various embodiments of the disclosure.

With reference to FIG. 2, a block diagram of a services registry and repository system, in accordance with various embodiments of the disclosure is presented. Services registry and repository system 200 is an illustrative embodiment of an example of an enhanced services registry and repository system as may be used on data processing system 100 of FIG. 1.

Services registry and repository system 200 comprises a number of components including services registry and repository 202, services access 204, service access information 206, services access context creator 208, services access context object 210, services access context object repository 212, data analyzer 214, interface 216 and requester 218. Service registry and repository 202 may be implemented as a set of separate units or a combination of registry and repository units as illustrated.

For each service access 204, of a request for services, service access information 206 associated with the request flows into service registry and repository 202. Service access information 206 typically contains parameters of the service request as well as information about the context in which the service request was made. For example, the context information typically includes, when available, user information for the user who made a request, the origin of the request in terms of location or device as in a browser versus a mobile device, requested quality of service, and other context information. Services access context creator 208 creates service access context object 210 using service access information 206 and environmental variables.

Service access context creator 208 creates an object based on general settings specified by an administrator of the system. For example, an administrator might specify that all data in the service access information should be captured. Alternatively, the administrator might specify that only a subset of data should be captured, for example, ignore the geographic context of the request. Services access context creator 208 has capabilities to deduct certain context properties based on specified rules. For example, a rule can specify when a certain service is accessed from a mobile device, a lower quality image should be sent in response, when available. Services access does not necessarily mean actual access to a function provided by a specific service. Services access also includes the concept of accessing any meta-data relevant to a service, for example, when a user of services registry and repository 202 searches for a service using interface 216 to services registry and repository 218.

Service access context object 210 is an object that contains data about the context in which a specific service was accessed. The information typically contains, but is not limited to, properties or attributes including time of access, origin of access, time of completed execution, if available, information about quality of service, when available, and information about the service itself. A service access context object is designed to be easily extendable, so that any context information specific to certain domains, services type, repository, service provider and other categories of information could be properly captured.

Services access context object repository 212 stores the services access context information about the services access for later analysis. Services access context object repository 212 may be implemented as a set of one or more repositories, for example, databases logically or physically associated to collectively provide a capability to contain and manage the service access information collected for services access requests.

Data analyzer 214 provides an analysis capability to process data contained in the services access context object repository 213 based on the properties or attributes available in each services access context object 210. For example, data analyzer 214 provides a query capability to provide responses to typical questions including: what services are typically invoked together with a specific service; what services are usually invoked prior to or after a given service; what services affect the response time of a given service; what is the rank of the service among other similar services based on a set of specific parameters that may include quality of service, or user feedback; what similar services are available in the repository, typically based on interface parameters or meta-data; what the quality of service correlations with other services, for example, if three other seemingly unrelated services are slow, will this service response also be slow. In other examples, the query can determine what other services are accessed from the same type of device; what other services are accessed in a certain time frame from a certain geography. Much more complicated queries can be built as well. Since all the service access context information is captured, the complexity of a query depends on the richness of such information. For example, when enough data is present, a user can construct complicated query as: what are the services that are accessed prior to a specific service, from a given locale in a specific time slot, using a specific hand held device by users with an age under 30 in a personal profile and who also have contact e-mail specified in the profile. Typically data analyzer 214 provides a result with a specific certainty. For example, a specific service is followed by service A 80 percent of the time.

Interface layer 216 provides an abstraction of data analyzer 214 application programming interfaces to insulate data analyzer 214 implementation from requesters 218. Since the information contained in services registry and repository 202 might be requested by many different forms of requester 218, an abstracted "plug-and-play" interface layer hides native data analyzer 214 application programming interfaces and translates queries from the different forms of requester 218 into data analyzer 214 specific queries. Interface 216 may be provided as a component or removed when such flexibility is not required.

Requester 218 is an information requester interested in the usage of intelligence information. Requester 218 can be a graphical user interface of services registry and repository 202 that allows a search for specific services and provides some suggestions on which other services have been searched for by other users interested in a specific service, which is similar to the previously presented book suggestions. Requester 218 can be a notification component that notifies service consumers of a possible outage because some other "softly related" services went down. Requester 218 can be application programming interface layer of services registry and repository 202, for example, that chooses a most suitable service in response to a dynamic mediation call based on a user feedback available for multiple similar services. Requester 218 can be a development environment connected to services registry and repository 202 requesting information on a "soft" impact when a service is modified as part of a development process. Requester 218 can also be any other part of a services oriented architecture implementation that is interested in services usage intelligence. Services registry and repository system 200 adds capabilities to a services registries and repositories implementation by utilizing services usage data to increase benefits provided by service registries and repositories to both service consumers and service providers. Requestor 218 is able to specify a specific certainty threshold for the expected results. For example, a certainty threshold may be specified as 100 percent certainty, 70 percent certainty and other selected values.

Figure 3:
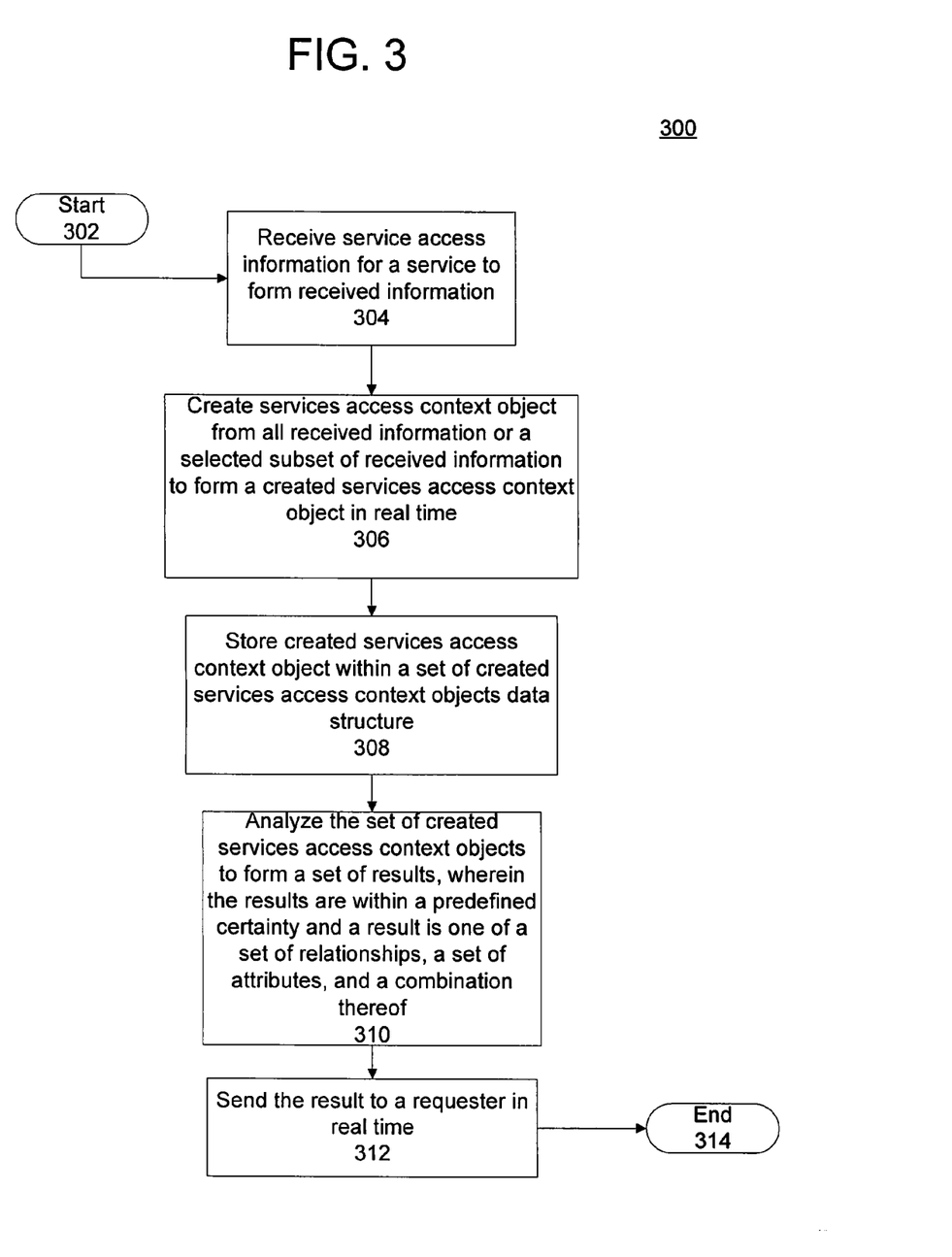
FIG. 3 is a flowchart of a service access context object creation process used in the services registry and repository of FIG. 2, in accordance with one embodiment of the disclosure.

With reference to FIG. 3, a flowchart of a service access context object creation process, in accordance with various embodiments of the disclosure is presented. Services access context object creation process 300 is an example of a process used in services registry and repository system 200 of FIG. 2.

Process 300 starts (step 302) and receives service access information for a service to form received information (step 304). Service access information is specific to a services access, typically the result of a request for a service. Service access information as previously stated typically contains, but is not limited to, properties or attributes including time of access, origin of access, time of completed execution, if available, information about quality of service, when available, and information about the service itself.

Process 300 performs "create services access context object" to form a created services access context object in real time (step 306). All received information or a selected subset of the received information is used. The services access context object is created on a basis of per access instance per service. For example, when ten service accesses are received for a service, each of the ten accesses will result in the creation of a services access context object having appropriate respective property or attribute information collected and processed. Real time in the context of use is not intended to imply instantaneous results, rather real time implies within the transaction lifetime. The transaction may be a service access or in another example a request for usage based information.

Store created services access context object in a data structure to form a stored services access context object is performed (step 308). The data structure contains a set of stored services access context objects. Stored services access context objects that may be associated with a specific service may be either logically associated in different physical locations or physically associated to one another in a same location. The data structure may be a memory including a collection of related data base tables, arrays, vectors or other suitable means of organizing and maintaining collections of information.

A typical entry includes an identifier of the service to which the access information applies and any captured descriptive information of the specific service access. For example, a main entry specifies a unique identifier for a service in addition to access information. Subsequent services accesses for the service are physically or logically associated with a main entry by reference to the unique services identifier but carry individual per access instance information.

Analyze the set of stored services access context objects to form a set of results is performed in real time (step 310). The result may be a set of relationships, a set of attributes or a combination of both. A set may include one or more instances and is not limited to multiple relationships or attributes. For example, an analysis may produce a pair of related services in a single relationship as a result. In another example, a result may comprise a series of services in a defined sequence according to an access pattern discovered by data mining of services access context object repository 210 of FIG. 2. The set of results is also typically conditioned to be within a predefined certainty.

The analysis provides results in the form of discovered patterns to identify services relationships, directed sequences of accesses and other forms of services access dependent correlations not related to any one user. Static information of the user as well as descriptive information of the service can be obtained and managed by other sources. Each service access, per service, that was captured is parsed for the required information, stored and then analyzed to produce a result. Having analyzed the information to produce a result, send the result to a requester is performed in real time (step 312) with process 300 terminating thereafter (step 314).

Figure 4:
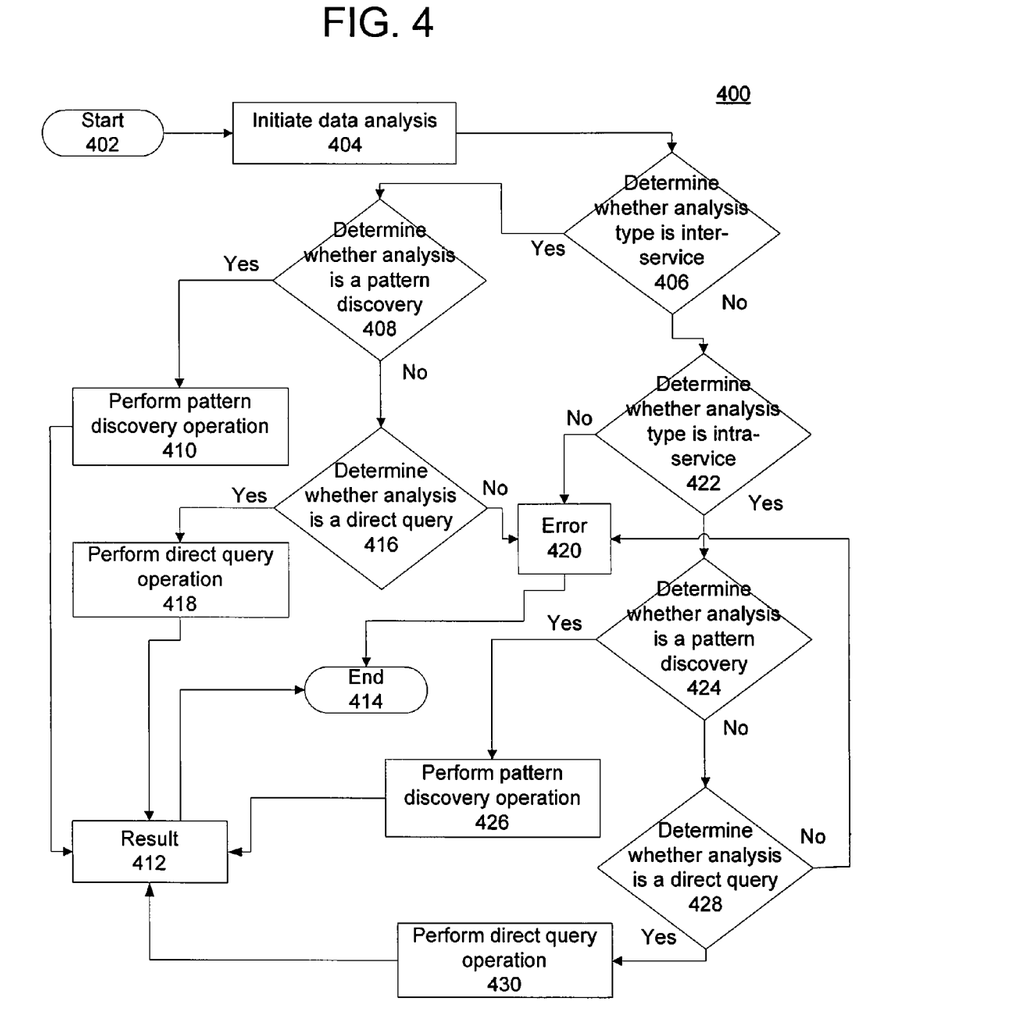
FIG. 4 is a flowchart of a data analysis portion of the process of FIG. 3, in accordance with one embodiment of the disclosure.

With reference to FIG. 4, a flowchart of a data analysis portion of the process of FIG. 3, in accordance with various embodiments of the disclosure is presented. Process 400 is an example of a data analysis process as used within data analyzer 212 of service registry and repository 218 of FIG. 2. Process 400 is also an example of a detailed representation of step 310 of FIG. 3.

Process 400 starts (step 402) and performs analysis of the content of services access context object repository, for example, services access context object repository 212 of FIG. 2 (step 404). A determination is made as to whether the analysis is inter-service for services access context objects being analyzed (step 406). When a determination is made that the analysis contains inter-service for services access context objects, a "yes" result is obtained. When a determination is made that the analysis is not inter-service for services access context objects, a "no" result is obtained.

When a "yes" result is obtained in step 406, process 400 determines whether the inter-service analysis for stored services access context objects involves pattern discovery (step 408). When a determination is made that the analysis for stored services access context objects involves pattern discovery, a "yes" result is obtained. When a determination is made that the analysis for stored services access context objects does not involve pattern discovery, a "no" result is obtained.

When a "yes" result is obtained in step 408, process 400 performs a pattern discovery operation (step 410). Pattern discovery operations are performed to identify usage patterns within the set of services accesses for a specific service. For example, in a set of ten services access context objects for service A, a pattern discovery operation would correlate and identify similarities in properties among the ten instances constrained to service A.

Output of a pattern discovery operation is used to create a result (step 412) with process 400 terminating thereafter (step 414). When a "no" result is obtained in step 408, process 400 determines whether the inter-service analysis for stored services access context objects involves a direct query (step 416). When a determination is made that the analysis for stored services access context objects is a directed query, a "yes" result is obtained. When a determination is made that the analysis for stored services access context objects is not a direct query, a "no" result is obtained. When a "no" result is obtained, process 400 indicates an error (step 420) and terminates (step 414).

When a "yes" result is obtained in step 416, a directed query against the content of services access context object repository, for example, services access context object repository 212 of FIG. 2 is performed (step 418). A directed query targets specific values or combination of values of properties or attributes of the set of services access context objects associated with a specific service. For example, for service A, a directed query may be used to identify an origin of the most frequent access. The directed query is typically more specific to an attribute or property value than a relationship of a pattern discovery operation. Output of a directed query operation is used to create a result (step 412) with process 400 terminating thereafter (step 414).

When a "no" result is obtained in step 406, a determination is made as to whether the analysis is intra-service for services access context objects being analyzed (step 422). When a determination is made that the analysis is intra-service for services access context objects, a "yes" result is obtained. When a determination is made that the analysis is not inter-service for services access context objects, a "no" result is obtained.

When a "yes" result is obtained in step 422, process 400 determines whether the intra-service analysis for services access context objects involves pattern discovery (step 424). When a determination is made that the analysis for stored services access context objects involves pattern discovery, a "yes" result is obtained. When a determination is made that the analysis for stored services access context objects does not involve pattern discovery, a "no" result is obtained.

When a "yes" result is obtained in step 424, process 400 performs a pattern discovery operation (step 426) similar to step 410. In this case however, pattern discovery operations are performed to identify usage patterns within the set of services accesses across a set of services. For example, in a set of ten services access context objects for services A, B and C a pattern discovery operation would correlate and identify similarities in properties among the ten instances across services A, B and C. The result may identify patterns of use relating the services to form soft links or association. For example, results may indicate a relation due to timing, a specific sequence in either a forward or reverse direction or other functional relationship. Pattern discovery operations tend to provide implicit results, whereas directed query is used to identify occurrences of known values or comparison to threshold values. Output of a pattern discovery operation of step 426 is used to create a result (step 412) with process 400 terminating thereafter (step 414).

When a "no" result is obtained in step 424, process 400 determines whether the intra-service analysis for services access context objects involves a direct query (step 428). When a determination is made that the analysis for stored services access context objects is a directed query, a "yes" result is obtained. When a determination is made that the analysis for services access context objects is not a direct query, a "no" result is obtained. When a "no" result is obtained in step 426, process 400 indicates an error (step 420) and terminates (step 414).

When a "yes" result is obtained in step 428, process 400 performs a directed query against the content of services access context object repository, for example, services access context object repository 212 of FIG. 2 (step 430). In this case a directed query targets specific values or combination of values of properties or attributes of a set of services access context objects across a set of services. For example, in a set of ten services access context objects for services A, B and C a directed query operation would count a frequency of occurrence of properties among the ten instances across services A, B and C. The directed query is typically more specific to an attribute or property value than a relationship of a pattern discovery operation. Output of a directed query operation of step 430 is used to create a result (step 412) with process 400 terminating thereafter (step 414). As previously presented, a result is sent to a requester, as in step 312 of process 300 of FIG. 3. An analysis request handled by the data analyzer typically consists of a set of interdependent pattern discovery and/or direct query requests, where a set comprises one or more requests.

Thus an illustrative embodiment provides a process for identifying implicit services links using service usage information. A computer-implemented process for identifying implicit services links, receives service access information for a service to form received information, creates a services access context object in real time from the all, or a subset of, received information to form a created services access context object, and stores the created services access context object in a data structure to form a stored services access context object. The computer-implemented process further analyzes a set of stored services access context objects in real time to form a set of results, wherein the results are within a predefined certainty, and sends the result to a requester. The set of results comprises a set of implicit soft links determined by usage information in the services access context objects, wherein the implicit soft links are implicit services links. The set of results typically includes the specific certainty information.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented process for identifying implicit service links executed by a processor of a computer, the computer-implemented process comprising:
   receiving service access information for a service access to a service to form received information;
   creating a services access context object on a basis of per access instance per service in real time from the received information, the received information is one of all received information or a selected subset of received information, the created services access context object being an object containing data about a context in which a specific service was accessed;
   storing the created services access context object in a data structure;
   receiving different service access information for a different service access to the service to form different received information;
   creating and storing a different services access context object from the different received information in the data structure, the data structure storing objects associated with a same service;
   analyzing a set of stored services access context objects in real time to form a set of results, the set of stored services access context objects including at least the stored services access context object and the different services access context object, the set of results include discovered patterns that identify services relationships, directed sequences of accesses and other forms of services access dependent correlations not related to any one user, the set of results is within a predefined certainty threshold specified by a requester; and
   sending the set of results to the requester.

2. The computer-implemented process of claim 1, wherein analyzing the set of stored services access context objects in real time to form the set of results further comprises:
   determining whether analysis is inter-service for services access context objects being analyzed;
   responsive to a determination that the analysis is inter-service for services access context objects being analyzed, determining whether the inter-service analysis for services access context objects involves pattern discovery; and
   responsive to a determination that the analysis for services access context objects involves pattern discovery, performing a pattern discovery operation within a service against a content of services access context object repository.

3. The computer-implemented process of claim 2, wherein analyzing the set of stored services access context objects in real time to form the set of results further comprises:
   responsive to a determination that the analysis for services access context objects does not involve pattern discovery, determining whether the inter-service analysis for services access context objects involves a direct query; and
   responsive to a determination that the analysis for services access context objects is a directed query, performing a directed query within a service against the content of services access context object repository.

4. The computer-implemented process of claim 1, wherein analyzing the set of stored services access context objects in real time to form the set of results further comprises wherein the set of results is one of, a set of relationships, a set of attributes or a combination of the set of relationships and the set of attributes, wherein the set may include one or more instances.

5. The computer-implemented process of claim 2, further comprises:
responsive to a determination that the analysis is not inter-service for services access context objects being analyzed, determining whether analysis is intra-service for services access context objects being analyzed;
responsive to a determination that the analysis is intra-service, determining whether the intra-service analysis for services access context objects involves pattern discovery; and
responsive to a determination that the analysis for services access context objects involves pattern discovery, performing a pattern discovery operation to identify usage patterns against a content of services access context object repository within the set of services accesses across a set of services.

6. The computer-implemented process of claim 5, further comprises:
responsive to a determination that the analysis for services access context objects does not involve pattern discovery, determining whether the intra-service analysis for services access context objects involves a directed query; and
responsive to a determination that the analysis for services access context objects involves a directed query, performing a directed query against the content of services access context object repository within the set of services accesses across the set of services.

7. The computer-implemented process of claim 1, wherein analyzing the set of stored services access context objects in real time to form the set of results further comprises wherein the set of results comprises a set of implicit soft links determined by usage information in the services access context objects, wherein the implicit soft links are implicit services links.

8. A computer program product for identifying implicit services links, the computer program product comprising:
a non-transitory computer recordable media containing computer executable program code stored thereon, the computer executable program code comprising:
computer executable program code for receiving service access information for a service access to a service to form received information;
computer executable program code for creating a services access context object on a basis of per access instance per service in real time from the received information, the received information is one of all received information or a selected subset of received information, the created services access context object being an object containing data about a context in which a specific service was accessed;
computer executable program code for storing the created services access context object in a data structure;
computer executable program code for receiving different service access information for a different service access to the service to form different received information;
computer executable program code for creating and storing a different services access context object from the different received information in the data structure, the data structure storing objects associated with a same service;
computer executable program code for analyzing a set of stored services access context objects in real time to form a set of results, the set of stored services access context objects including at least the stored services access context object and the different services access context object, the set of results include discovered patterns that identify services relationships, directed sequences of accesses and other forms of services access dependent correlations not related to any one user, the set of results is within a predefined certainty threshold specified by a requester; and
computer executable program code for sending the set of results to the requester.

9. The computer program product of claim 8, wherein computer executable program code for analyzing the set of stored services access context objects in real time to form the set of results further comprises:
computer executable program code for determining whether analysis is inter-service for services access context objects being analyzed;
computer executable program code, responsive to a determination that the analysis is inter-service for services access context objects being analyzed, for determining whether the inter-service analysis for services access context objects involves pattern discovery; and
computer executable program code, responsive to a determination that the analysis for services access context objects involves pattern discovery, for performing a pattern discovery operation within a service against a content of services access context object repository.

10. The computer program product of claim 9, wherein computer executable program code for analyzing the set of stored services access context objects in real time to form the set of results further comprises:
computer executable program code, responsive to a determination that the analysis for services access context objects does not involve pattern discovery, for determining whether the inter-service analysis for services access context objects involves a direct query; and
computer executable program code, responsive to a determination that the analysis for services access context objects is a directed query, for performing a directed query within a service against the content of services access context object repository.

11. The computer program product of claim 8, wherein computer executable program code for analyzing the set of stored services access context objects in real time to form the set of results further comprises wherein the set of results is one of, a set of relationships, a set of attributes or a combination of the set of relationships and the set of attributes, wherein the set may include one or more instances.

12. The computer program product of claim 9, further comprises:
computer executable program code, responsive to a determination that the analysis is not inter-service for services access context objects being analyzed, for determining whether analysis is intra-service for services access content objects being analyzed;
computer executable program code, responsive to a determination that the analysis is intra-service, for determining whether the intra-service analysis for services access context objects involves pattern discovery; and
computer executable program code, responsive to a determination that the analysis for services access context objects involves pattern discovery, for performing a pattern discovery operation to identify usage patterns against a content of services access context object repository within the set of services accesses across a set of services.

13. The computer program product of claim 12, further comprises:
  computer executable program code responsive to a determination that the analysis for stored services access context objects does not involve pattern discovery computer executable program code for determining whether the intra-service analysis for services access context objects involves a directed query; and
  computer executable program code, responsive to a determination that the analysis for services access context objects involves a directed query, for performing a directed query against the content of services access context object repository within the set of services accesses across the set of services.

14. The computer program product of claim 8, wherein computer executable program code for analyzing the set of services access context objects in real time to form the set of results further comprises wherein the set of results comprises a set of implicit soft links determined by usage information in the services access context objects, wherein the implicit soft links are implicit services links.

15. An apparatus for identifying implicit services links, the apparatus comprising:
  a communications fabric;
  a memory connected to the communications fabric, wherein the memory contains computer executable program code;
  a communications unit connected to the communications fabric;
  an input/output unit connected to the communications fabric;
  a display connected to the communications fabric; and
  a processor unit connected to the communications fabric, wherein the processor unit executes the computer executable program code to direct the apparatus to:
    receive service access information for a service access to a service to form received information;
    create a services access context object on a basis of per access instance per service in real time from the received information, the received information is one of all received information or a selected subset of received information, the created services access context object being an object containing data about a context in which a specific service was accessed;
    store the created services access context object in a data structure;
    receive different service access information for a different service access to the service to form different received information;
    create and store a different services access context object from the different received information in the data structure, the data structure storing objects associated with a same service;
    analyze a set of stored services access context objects in real time to form a set of results, the set of stored services access context objects including at least the stored services access context object and the different services access context object, the set of results include discovered patterns that identify services relationships, directed sequences of accesses and other forms of services access dependent correlations not related to any one user, the set of results is within a predefined certainty threshold specified by a requester; and
    send the set of results to the requester.

16. The apparatus of claim 15, wherein the processor unit further executes the computer executable program code to analyze the set of stored services access context objects in real time to form the set of results to direct the apparatus to:
  determine whether analysis is inter-service for services access context objects being analyzed;
  responsive to a determination that the analysis is inter-service for services access context objects being analyzed, determine whether the inter-service analysis for services access context objects involves pattern discovery; and
  responsive to a determination that the analysis for services access context objects involves pattern discovery, perform a pattern discovery operation within a service against a content of services access context object repository.

17. The apparatus of claim 16, wherein the processor unit further executes the computer executable program code to analyze the set of stored services access context objects in real time to form the set of results to direct the apparatus to:
  responsive to a determination that the analysis for services access context objects does not involve pattern discovery, determine whether the inter-service analysis for services access context objects involves a direct query; and
  responsive to a determination that the analysis for services access context objects is a directed query, perform a directed query within a service against the content of services access context object repository.

18. The apparatus of claim 15, wherein the processor unit further executes the computer executable program code to direct the apparatus to analyze the set of stored services access context objects in real time to form the set of results further comprises wherein the set of results is one of, a set of relationships, a set of attributes or a combination of the set of relationships and the set of attributes, wherein the set may include one or more instances wherein the set of results comprises a set of implicit soft links determined by usage information in the services access context objects.

19. The apparatus of claim 16, wherein the processor unit further executes the computer executable program code to:
  responsive to a determination that the analysis is not inter-service for services access context objects being analyzed, to determine whether analysis in intra-service for services access context being analyzed;
  responsive to a determination that the analysis is intra-service, to determine whether the intra-service analysis for services access context objects involves pattern discovery; and
  responsive to a determination that the analysis for services access context objects involves pattern discovery, perform a pattern discovery operation to identify usage patterns against a content of services access context object repository within the set of services accesses across a set of services.

20. The apparatus of claim 19, wherein the processor unit further executes the computer executable program code to:
  responsive to a determination that the analysis for stored services access context objects does not involve pattern discovery to determine whether the intra-service analysis for services access context objects involves a directed query; and
  responsive to a determination that the analysis for services access context objects involves a directed query, to perform a directed query against the content of services access context object repository within the set of services accesses across the set of services.

* * * * *